United States Patent [19]
Müller

[11] Patent Number: 5,146,315
[45] Date of Patent: Sep. 8, 1992

[54] METHOD AND APPARATUS FOR AUTOMATICALLY SETTING PARAMETERS IN THE DERIVATION OF A MIXER KEYING SIGNAL FROM VIDEO SIGNALS

[75] Inventor: Klaus-Dieter Müller, Weiterstadt, Fed. Rep. of Germany

[73] Assignee: BTS Broadcast Television Systems GmbH, Darmstadt, Fed. Rep. of Germany

[21] Appl. No.: 581,280

[22] Filed: Sep. 12, 1990

[30] Foreign Application Priority Data

Sep. 30, 1989 [DE] Fed. Rep. of Germany ....... 3932758

[51] Int. Cl.⁵ ............................................. H04N 5/262
[52] U.S. Cl. ....................................... 358/22; 358/183
[58] Field of Search ................. 358/22, 178, 172, 183, 358/150, 22 CK, 30, 27, 28, 32, 174

[56] References Cited

U.S. PATENT DOCUMENTS

| | | | |
|---|---|---|---|
| 4,319,266 | 3/1982 | Bannister | 358/22 CK |
| 4,394,680 | 7/1983 | Watanabe | 358/22 CK |
| 4,396,939 | 8/1983 | Kitahama | 358/22 CK |
| 4,630,101 | 12/1986 | Inaba et al. | 358/22 CK |
| 4,695,886 | 9/1987 | Schofield | 358/178 |
| 4,774,507 | 9/1988 | Kashigi et al. | 358/22 |

*Primary Examiner*—James J. Groody
*Assistant Examiner*—Glenton B. Burgess
*Attorney, Agent, or Firm*—Frishauf, Holtz, Goodman & Woodward

[57] ABSTRACT

In a system in which a color-controlled signal is put through a limiter to produce a video mixer signal, variable settings are provided for for color hue, color selectivity, clip level and control signal amplification. The setting magnitudes are preliminarily varied while peak values of a color-controlled video mixer signal are measured, with the settings corresponding to peak values being stored for subsequent use. The apparatus can also be used to generate a video mixer signal controlled by luminance range selection, or controlled by a combination of color hue and luminance range selection. The preliminary determination of settings can be limited to an area defined by a movable window of adjustable size.

13 Claims, 1 Drawing Sheet

METHOD AND APPARATUS FOR AUTOMATICALLY SETTING PARAMETERS IN THE DERIVATION OF A MIXER KEYING SIGNAL FROM VIDEO SIGNALS

Cross reference to related pending application:
Application of Klaus-Dieter Muller, claiming the priority of German Patent Application P 39 32 757.

This invention concerns the mixing of different pictures to produce a composite television picture in which the boundaries between the different pictures are defined by a keying signal supplied to a mixer to which the pictures to be mixed are simultaneously available.

Such mixing of pictures commonly utilizes the so-called chroma key method which is sometimes called the blue wall method.

One of the pictures to be mixed contains a predetermined color, usually a blue color, that is absent in the other picture. Although the picture containing the predetermined color can be either a foreground signal or a background signal, it is assumed for purposes of explanation that it is the foreground signal that contains the predetermined color.

A keying signal which is derived from the foreground signal is supplied to the picture mixer. Various systems are known for providing a selection of the color to be replaced and a setting of the color selectivity. The signal for selecting the color at a prescribed selectivity is supplied to a limiter circuit in which the clip voltage and the amplification can be adjusted. The setting of these setting values can be very critical under some circumstances, because, for example, a blue wall can fail to have a uniform color over its entire area as the result of non-uniformities of illumination or shadowing effects. The setting is also critical if the picture that is to be distinguished from the blue wall picture has some colors that are hard to distinguish from that of the blue wall.

SUMMARY OF THE INVENTION

It is an object of the present invention to provide a method and apparatus by which the setting of the above-mentioned magnitudes, which may be referred to as parameters of the mixing system, can be performed automatically to a great extent.

Briefly, when a setting value changes, a characteristic magnitude of a video signal obtained by color selection or luminance range selection, is measured and when a suitable characteristic magnitude is found, the value of the setting magnitude then present is stored for further use.

The method of the invention is suitable both for settings for mixing color television signals and for settings for mixing monochrome video signals. In the latter case the mixing boundaries are determined with reference to a luminance value range instead of with respect to a selected color range.

Preferably the characteristic value of the video signal that is measured is the peak value. It is also possible to measure an average value or some other midvalue. In many cases the setting changed by the method of the invention can be used directly. In particularly critical scenes, however, the automatic setting can be supplemented or complemented by manual correction or fine setting.

In the practice of the method of the invention it is advantageous first to derive the keying signal in a known way from a foreground signal with the selection of a color hue with a certain selectivity, the hue and selectivity being represented as setting values, and then to transform the signal so derived into a switching signal by further preliminary processing. For that purpose, with contemporaneous change of the hue setting the peak value of the precursor of the keying signal already derived is measured and at that maximum of the peak value the corresponding value of the hue setting is stored.

In this procedure, until the reaching of the above-mentioned setting maximum a setting value for a low selectivity is used and then a further variation of the hue setting is performed with greater selectivity in the region of the previous maximum, until again a maximum is obtained.

For the shaping of the keying signal a clip level and a value of amplification can be set in such a way that both the negative and the positive peak value of the keying signal are measured during simultaneous change of the clip level and amplification settings and thereafter at a prescribed peak value these settings are stored. It is possible for the measurement of a characteristic magnitude to be performed only over a prescribed segment of the picture defined by a suitably generated adjustable window.

BRIEF DESCRIPTION OF THE DRAWINGS

The invention is further described, by way of illustrative example, particularly in its apparatus aspects, with reference to the annexed drawings, in which.

DESCRIPTION OF THE ILLUSTRATED EMBODIMENT

Figure 1:
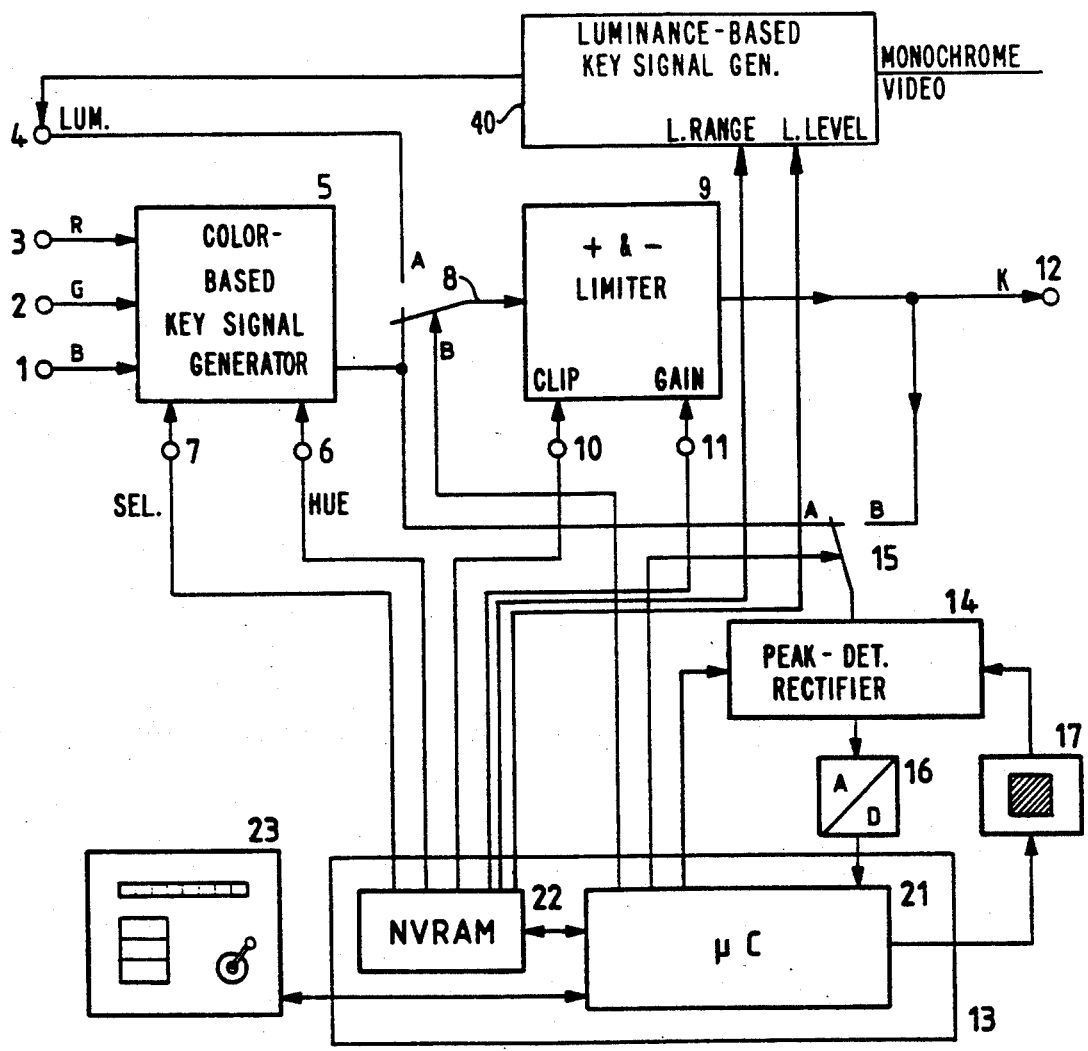
FIG. 1 is a circuit block diagram for carrying out the method of the invention.

FIG. 1 shows three inputs 1, 2 and 3 for supply of components B, G and R of a foreground signal respectively in three channels, for purposes of color-controlled mixer keying. A luminance key signal generated in a luminance-based key signed generator 40 can be supplied through another input 4 for mixing monochrome video signals. Returning now to the subject of color-control mixer keying, foreground signal can also be provided, instead of in the form of R, G and B signals, as shown in the form of Y, R-Y and B-Y signals, in each case three channels being required. These three channels are supplied to a mixer control circuit 5 of a known type in which there is derived, from the three channels of the foreground signal key, a signal which is dependent upon not only the foreground signal itself, but also upon a setting value supplied at 6, marked HUE in the drawing to signify that it relates to the hue of a selected color. The circuit 5 represents in principle an electrical color filter which suppresses the foreground signal whenever its color content fails to correspond to the hue setting. The selectivity of the circuit 5 can be varied by means of another setting value SEL, which can be supplied as a signal to the input 7.

The output signal of the circuit 5 is not yet the desired keying signal. It is supplied through a changeover switch 8 to a limiter circuit 9, which, like the circuit 5, is a circuit known as useful in connection with the generation of a video mixer keying signal. A clip threshold and an amplification value can be set in the limiter circuit 9, the input 10 serving for the setting CLIP and the input 11 being for the setting GAIN. The mixer keying signal K is made available at the output 12 of the limiter 9. The switch 8 serves to select between a luminance controlled signal generated by the luminance-based key signal generator 40 and the color controlled signal described above, for producing the mixer keying signal K.

For carrying out the method of the invention the system of FIG. 1 also contains a control unit 13, a peak detecting rectifier 14, a changeover switch 15, an analog-to-digital converter 16 and a window generator 17. The control unit 13 contains essentially a microcomputer 21 which is connected to a non-volatile random access memory 12 for storing and retrieving the setting values SEL, HUE, CLIP and GAIN. A manual input unit 23 equipped with appropriate data displays is also provided for use by an operator or supervisor.

The function of the system shown in FIG. 1 will first be explained with reference to setting of the color hue. For that purpose the switch 8 is in its position B and the switch 15 in its position A shown in FIG. 1. The peak value rectifier 14 detects positive peak values. On the basis of the assumption that the keying color has the highest saturation found within the entire picture, which corresponds to the highest level possible at the output of the color key circuit 5, a simple manner of operation is established for accurately setting the keying color, as follows.

As a first step the setting value HUE applied from the control unit 13 is automatically changed (swept) over the entire color circle, while the peak value is continuously measured. The hue with the highest level is the hue of greatest saturation. In order to detect the maximum as fast as possible and with the greatest possible accuracy, a maximum is determined first in large steps with smaller selectivity and then the hue is given a fine setting by finding the maximum again in small steps at a maximum usable value of selectivity.

If in the televised or recorded picture other colors of high color saturation are found in addition to the desired color keying hue, these other colors may also be recognized as color keying hues. In order to avoid that, the setting range for the setting value HUE can be limited to the neighborhood of the keying color selected in the particular case. This is easily possible, since the usually provided keying color is in general rather well known and can be provided as an input for a stored value in the control unit 13. For obtaining an unambiguous result, it is also possible to exclude predetermined or pre-entered color ranges.

In accordance with a further development of the invention a window generator 17 is provided with which a movable measuring window is generated, the size of which is adjustable as well as its position. By means of this window, the previously described sequence of measurements for setting the HUE value can be made on the basis of only that portion of a video signal which was previously selected by positioning and adjusting the size of the measuring window.

During the setting of the keying color, a signal is sufficient as the foreground signal that might deliver only the keying color (viewing of the blue wall without the appearance of any person or decoration). In the setting of the clip threshold and of the amplification setting, however, a signal is needed that also contains an object which is to be mixed into the composite picture, as will now be explained.

Figure 2:
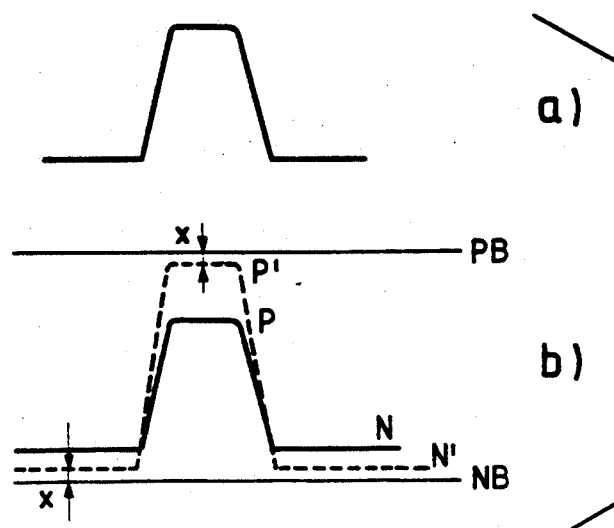
FIG. 2 is a pair of graphs (a) and (b), drawn to the same time scale illustrating signals appearing in the circuit of FIG. 1.

For automatic setting of the limiter circuit 9 the switch 15 is put into its position B shown in FIG. 1. The switch 8 is then in the position A or B according to whether the keying signal is to be generated on a color basis or is to be derived from a monochrome video signal. The measuring window is brought to its maximum size, so that the entire picture area is included. Furthermore, for reasons of margin over noise or disturbances, the selectivity is initially set at minimum. In the following explanation reference will be made to FIG. 2 which shows the diagrams of an input signal (a) and an output signal (b) of the limiter circuit.

Before every automatic limiter setting operation the output of the limiter circuit 9 is measured with the peak value rectifier 14 and the analog-to-digital converter 16. With corresponding control the positive and negative limiting potentials are measured, these being designated in the portion (b) of FIG. 2 as PB and NB. For this preparatory step a video signal is not absolutely necessary. It is sufficient to control the limiter circuit 9 in such a way that it provides a measurement of the limiting potentials to be measured (PB or NB).

Beginning with the amplification at the lowest GAIN setting, the positive peak value P and the negative peak value N of the limiter output are alternately measured. By corresponding change of the clip threshold CLIP and the amplification GAIN, a desired setting can then be found for which the spacing between P' and PB and the spacing between N' and NB are both just distinguishable from zero. This spacing is designated as x in portion (b) of FIG. 2 and can be automatically established.

The setting determined as just mentioned provides a combination of foreground and background pictures with soft transitions. Sharper transitions can be obtained by manual lowering of the GAIN setting.

In the preparation of scenes for the color controlled keying operation care is taken to avoid the presence in the foreground picture of any color that lies in the neighborhood of the keying color in the color circle. This cannot always be avoided, however. At the corresponding location of the picture the background then appears through the foreground. In most cases this disturbance can be avoided by raising the selectivity. For that purpose, however, it is within the scope of the method of the invention to provide a further automatic setting of the selectivity, as follows. The window is positioned at the corresponding picture location and the switch 15 is put into its position A. Then the measurement of the positive peak value is determined and set. Thereafter the setting magnitude SEL is shifted long enough for a minimum for the value zero to be reached.

The switch positions required for the various setting procedures, the switching over of the peak value rectifier and the generation of a window can be programmed in such a way that the operator needs merely to enter, at his operating desk or panel, the kind of setting operation that is to be carried out.

When all settings (SEL, HUE, CLIP, GAIN) are carried out, a mixer control signal for the color key method can thereafter be produced in which the setting values are read out of the memory 22 (FIG. 1) and supplied to the color key control circuit 5 and to the limiter circuit 9.

Although the invention has been described with reference to a particular illustrative example, it will be understood that variations and modifications are possible within the inventive concept. For example it is evident from the above description how the luminance magnitude (level) and the luminance selectivity (range) settings of the luminance-based key signal generator 40 would be set by the control unit 13.

I claim:

1. A method of automatically determining and storing setting values for a video mixer control signal generator having an output connected to a control input of a video mixer which also has at least one input connected to a source of a video signal, said control signal generator including a first unit and a second unit, both said units having an output automatically connectable to an input of a detector of a characteristic signal magnitude which is a measure of signal amplitude, said detector having an output, said second unit being a limiter having an input connected to said output of said first unit, said first unit having at least one input connected to said source of said video signal and said second unit having an output connected to said control input of said video mixer, each of said units having two inputs for first and second setting values for controlling the operation of the respective unit, said method comprising the steps of:

varying a setting value supplied to a selected one of said units of said video mixer control signal generator at a first of said setting value inputs of said selected unit and at the same time measuring a characteristic magnitude signal at said output of said selected unit by said magnitude detector in response to a signal derived from a video signal of said video signal source, said varying of said setting value extending over a predetermined range of usable values of said setting at least until said characteristic magnitude of the signal at said selected unit output is measured, and when a suitable characteristic magnitude of a signal at the output of said selected unit is reached, then, while the characteristic magnitude of said signal at said output of said selected unit is being obtained, storing said previously varied setting value which is then present, for use in subsequent control of said video mixer.

2. The method of claim 1, wherein said characteristic magnitude is the peak value of said signal at said output of said selected unit produced in response to a signal derived from a video signal of said video signal source and said characteristic magnitude detector is a peak value detector.

3. The method of claim 2, wherein said first unit included in said video mixer control signal generator is a color-based key signal generator requiring color hue and selectivity settings and having first and second setting value inputs respectively for color hue and color selectivity setting values, wherein color hue and selectivity setting values are varied in the setting value varying step and wherein during variation of the hue setting value, the peak value of the signal just then derived in the variation step is measured by said detector and when a maximum of said peak value appears the setting value for hue is stored and thereafter, in said first unit a signal derived from said video signal from said video signal source is transformed into a switching signal by reference to said stored setting value for color hue.

4. The method of claim 3, wherein until the appearance of a maximum of said peak value in the setting value varying step the color selectivity setting has a low value for providing coarse color selectivity and a further step of varying the setting value of color hue is performed in the color hue region of said maximum with a high setting of color selectivity for producing fine color selectivity until again a maximum of said peak value appears, for which the hue setting value then provided is the hue setting value which is stored.

5. The method of claim 3, wherein said limiter which is said second unit of said video mixer control signal generator requires settings for clip level and amplification gain and has a first setting value input for clip level setting values and a second setting value input for amplification gain setting values, wherein additional steps are performed in said limiter unit for setting a clip level and an amplification gain for producing a mixer control signal, and wherein, in said additional steps, clip level adjustment and amplification gain variation while measuring a peak value of the output of said limiting unit is performed for positive peak values and for negative peak values with simultaneous changing of setting values of clip level and amplification gain when changing from positive to negative peak detection or vice versa, followed by storage of those setting values which are in effect at the time of each maximum peak value detection.

6. The method of claim 1, wherein said characteristic magnitude is an average value of the signal.

7. The method of claim 1, wherein the measurement of characteristic magnitude is limited to a predetermined section of the picture area.

8. Apparatus for producing color-controlled keying of a video mixer, said apparatus comprising a color-controlled signal circuit (5) and a limiter circuit (9( and further comprising:

peak value detection rectifier means, selectively connectable to an output of said color-controlled signal circuit (5) or to an output of said limiter circuit (9) and having an output;

a control unit (13) having connections to control inputs (6, 7, 10, 11) of said color-controlled signal circuit (5) and of said limiter circuit (9) for supplying setting values for said color-controlled signal circuit and for said limiter circuit and having an input connected to said output of said peak value detection rectifier means, said control unit (13) being connected for controlling selective connection of said rectifier means to said output of said color-control signal circuit (5) or to said output of said limiter circuit (9);

means for varying said setting values, and means in said control unit (13) for storing setting values corresponding to the appearance of peak values in said output of said rectifier means during variation of setting values by said varying means and for supplying stored setting values to said control input connections to said color-control circuit (5) and to said limiter circuit (9).

9. The apparatus of claim 8, wherein said control unit (13) contains a microcomputer (21).

10. The apparatus of claim 8, wherein a non-volatile memory (22) is provided for storing and retrieving said setting values which correspond to the detection of said peak values.

11. The method of claim 2 wherein said first unit included in said video mixer control signal generator is a luminance-based key signal generator having an input connected to said video signal source and requiring luminance level and luminance selectivity setting values and having first and second setting value inputs respectively for said luminance level and luminance selectivity setting values and wherein during variation of the luminance level setting values, the peak value of the signal just then derived in the variation step is measured by said detector and when a maximum of the peak value appears the setting value of luminance level is stored and a signal derived from said video signal is thereafter transformed into a switching signal by reference to said stored setting value for luminance level.

12. The method of claim 11, wherein until the appearance of a maximum of said peak value the luminance selectivity setting has a low value for coarse luminance selectivity and a further step of varying the setting value of luminance level is performed in the region of said maximum with a high setting of luminance selectivity for producing fine luminance selectivity until again a maximum of said peak values appears for which the luminance level setting value then provided is the luminance level setting value which is stored.

13. The method of claim 11, wherein said limiter which is said second unit of said video mixer control signal generator requires settings for clip level and amplification gain and has a first setting value input for clip level setting values and a second setting value input for amplification gain setting values, wherein additional steps are performed in said limiter unit for setting a clip level and an amplification gain for producing a mixer control signal, and wherein, in said additional steps, clip level adjustment and amplification gain variation while measuring a peak value of the output of said limiter is performed for positive peak values and for negative peak values with simultaneous changing of setting values of clip level and amplification gain when changing from positive to negative peak detection or vice versa, followed by storage of those setting values which are in effect at the time of each maximum peak value detection.

* * * * *